(12) United States Patent
Marcello et al.

(10) Patent No.: US 8,080,360 B2
(45) Date of Patent: Dec. 20, 2011

(54) TONER PREPARATION PROCESSES

(75) Inventors: Vincenzo G Marcello, Webster, NY (US); Steven M Malachowski, East Rochester, NY (US); Tie Hwee Ng, Mississauga (CA); Chieh-Min Cheng, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 1757 days.

(21) Appl. No.: 11/187,030

(22) Filed: Jul. 22, 2005

(65) Prior Publication Data

US 2007/0020553 A1    Jan. 25, 2007

(51) Int. Cl.
G03G 9/08    (2006.01)

(52) U.S. Cl. .................. 430/137.14; 523/333; 523/334

(58) Field of Classification Search ............. 430/137.14, 430/137; 523/333, 334
See application file for complete search history.

(56) References Cited

U.S. PATENT DOCUMENTS

| | | |
|---|---|---|
| 3,847,604 A | 11/1974 | Hagenbach et al. |
| 4,113,796 A | 9/1978 | Bischoff et al. |
| 4,338,390 A | 7/1982 | Lu |
| 4,803,054 A * | 2/1989 | Sillerud et al. ............. 422/109 |
| 4,935,326 A | 6/1990 | Creatura et al. |
| 4,937,166 A | 6/1990 | Creatura et al. |
| 5,278,020 A | 1/1994 | Grushkin et al. |
| 5,290,654 A | 3/1994 | Sacripante et al. |
| 5,308,734 A | 5/1994 | Sacripante et al. |
| 5,344,738 A | 9/1994 | Kmiecik-Lawrynowicz et al. |
| 5,346,797 A | 9/1994 | Kmiecik-Lawrynowicz et al. |
| 5,348,832 A | 9/1994 | Sacripante et al. |
| 5,364,729 A | 11/1994 | Kmiecik-Lawrynowicz et al. |
| 5,366,841 A | 11/1994 | Patel et al. |
| 5,370,963 A | 12/1994 | Patel et al. |
| 5,403,693 A | 4/1995 | Patel et al. |
| 5,405,728 A | 4/1995 | Hopper et al. |
| 5,418,108 A | 5/1995 | Kmiecik-Lawrynowicz et al. |
| 5,462,828 A | 10/1995 | Moffat et al. |
| 5,496,676 A | 3/1996 | Croucher et al. |
| 5,501,935 A | 3/1996 | Patel et al. |
| 5,527,658 A | 6/1996 | Hopper et al. |
| 5,585,215 A | 12/1996 | Ong et al. |
| 5,650,255 A | 7/1997 | Ng et al. |
| 5,650,256 A | 7/1997 | Veregin et al. |
| 5,723,253 A | 3/1998 | Higashino et al. |
| 5,744,520 A | 4/1998 | Kmiecik-Lawrynowicz et al. |

(Continued)

FOREIGN PATENT DOCUMENTS

EP    1 491 968 A1    12/2004

*Primary Examiner* — Christopher Rodee
*Assistant Examiner* — Rachel Zhang
(74) *Attorney, Agent, or Firm* — Oliff & Berridge, PLC

(57) ABSTRACT

A method of making toner particles, includes: mixing a latex emulsion, a colorant emulsion, an optional was emulsion, and optional additives in a first reactor to form a slurry; discharging the slurry from the first reactor to a second reactor through a homogenizer; heating the slurry in the second reactor to form aggregated particles in said slurry; discharging the aggregated particles and slurry from the second reactor to a third reactor; heating the aggregated particles and slurry in the third reactor to coalesce the aggregated particles into toner particles; discharging the toner particles and slurry from the third reactor to a fourth reactor; cooling the toner particles; optionally classifying said toner particles to remove coarse particles; and optionally washing and drying said toner particles, wherein the first reactor, second reactor, third reactor, and fourth reactor are at least two different reactors.

22 Claims, 1 Drawing Sheet

U.S. PATENT DOCUMENTS

| | | |
|---|---|---|
| 5,747,215 A | 5/1998 | Ong et al. |
| 5,763,133 A | 6/1998 | Ong et al. |
| 5,766,818 A | 6/1998 | Smith et al. |
| 5,804,349 A | 9/1998 | Ong et al. |
| 5,827,633 A | 10/1998 | Ong et al. |
| 5,840,462 A | 11/1998 | Foucher et al. |
| 5,853,944 A | 12/1998 | Foucher et al. |
| 5,869,215 A | 2/1999 | Ong et al. |
| 5,916,725 A | 6/1999 | Patel et al. |
| 6,120,967 A | 9/2000 | Hopper et al. |
| 2003/0180650 A1* | 9/2003 | Patel et al. ............... 430/137.14 |
| 2004/0137357 A1* | 7/2004 | Bartel et al. ............. 430/137.14 |
| 2004/0202950 A1* | 10/2004 | Ahuja et al. ............. 430/137.14 |

* cited by examiner

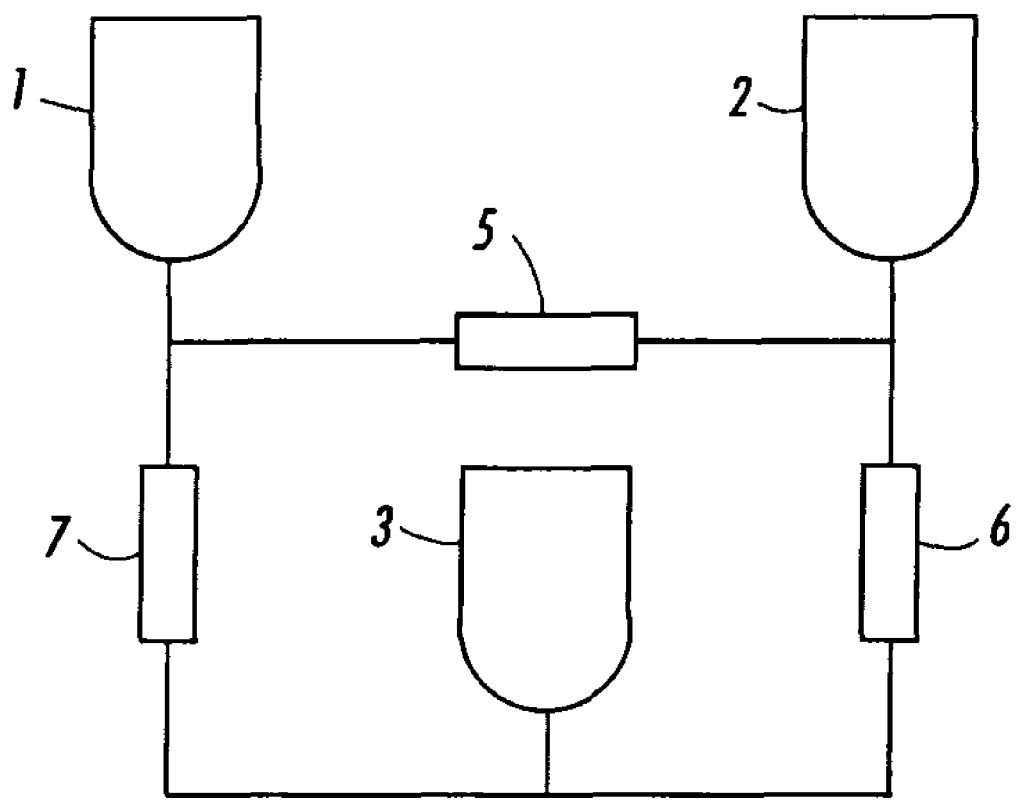

TONER PREPARATION PROCESSES

BACKGROUND

This disclosure is generally directed to processes for making toner compositions and more specifically directed to emulsion/aggregation processes for making toner compositions comprising a resin and a colorant, and other optional additives.

Emulsion aggregation toners are excellent toners to use in forming print and/or xerographic images in that the toners can be made to have uniform sizes and in that the toners are environmentally friendly. U.S. patents describing emulsion aggregation toners include, for example, U.S. Pat. Nos. 5,370,963, 5,418,108, 5,290,654, 5,278,020, 5,308,734, 5,344,738, 5,403,693, 5,364,729, 5,346,797, 5,348,832, 5,405,728, 5,366,841, 5,496,676, 5,527,658, 5,585,215, 5,650,255, 5,650,256, 5,501,935, 5,723,253, 5,744,520, 5,763,133, 5,766,818, 5,747,215, 5,827,633, 5,853,944, 5,804,349, 5,840,462, and 5,869,215, the entire disclosures of which are incorporated herein by reference.

Two main types of emulsion aggregation toners are known. First is an emulsion aggregation process that forms acrylate based, e.g., styrene acrylate, toner particles. See, for example, U.S. Pat. No. 6,120,967, incorporated herein by reference in its entirety, as one example of such a process. Second is an emulsion aggregation process that forms polyester, e.g., sodio sulfonated polyester. See, for example, U.S. Pat. No. 5,916,725, incorporated herein by reference in its entirety, as one example of such a process.

Emulsion aggregation techniques typically involve the formation of an emulsion latex of the resin particles, which particles have a small size of from, for example, about 5 to about 500 nanometers in diameter, by heating the resin, optionally with solvent if needed, in water, or by making a latex in water using an emulsion polymerization. A colorant dispersion, for example of a pigment dispersed in water, optionally also with additional resin, is separately formed. The colorant dispersion is added to the emulsion latex mixture, and an aggregating agent or complexing agent is then added to form aggregated toner particles. The aggregated toner particles are heated to enable coalescence/fusing, thereby achieving aggregated, fused toner particles.

U.S. Pat. No. 5,462,828 describes a toner composition that includes a styrene/n-butyl acrylate copolymer resin having a number average molecular weight of less than about 5,000, a weight average molecular weight of from about 10,000 to about 40,000 and a molecular weight distribution of greater than 6 that provides excellent gloss and high fix properties at a low fusing temperature.

As described above and in the cited patents, emulsion aggregation toner processes typically include five steps. Those steps include (1) emulsion polymerization to prepare primary polymer particles, (2) aggregation/coalescence in which the primary polymer particles and other particles such as colorant are aggregated together into toner sized particles, (3) wet-sieving in which the toner sized particles are classified to remove coarse particles, (4) washing, and (5) drying. During this process, the two most time-consuming steps, and thus the rate-limiting steps in the process, are the aggregation/coalescence and wet sieving steps.

The aggregation/coalescence step is particularly time-consuming, as three sub-steps are performed in the same reactor. First is homogenization. During homogenation, flocculant or coagulant is added and high amounts of shear are provided to start initial stages of particle formation. Second is a first heating step, in which the reactor contents are heated to about 35 to about 50 or about 60° C., and the polymer aggregation proceeds. Third is a second heating step, in which the reactor contents are heated to about 70 to about 100 or about 120° C., and the aggregated particles are coalesced into final toner particles.

Despite the various emulsion/aggregation processes that are known and used in the art, a need continues to exist for new and improved processes. For example, although emulsion/aggregation processes can provide toner particles having a particular desired particle size with a narrow particle size distribution, the need continues to exist for processes that avoid the generation of coarse particles that must be removed in a subsequent sieving operation. A need also continues to exist for more streamlined production processes, that would allow higher throughput in the emulsion/aggregation process.

SUMMARY

The present disclosure addresses these and other needs, in embodiments, by providing an improved emulsion/aggregation process. In particular, the present disclosure provides an improved aggregation/coalescence procedure and apparatus, that enables higher process throughput, causes less process down time, and provides reduced coarse particle formation thus allowing the optional removal of a wet sieving step from the overall process. The disclosure addresses at least several deficiencies with the conventional aggregation/coalescence step, which are addressed by this disclosure.

During the homogenation step, flocculant or coagulant is added and high amounts of shear are provided to start initial stages of particle formation. In theory, all contents of the reactor would be exposed to the high amount of micro-shear provided by the homogenizer, in order to break up any initial existing large aggregates that may form before aggregation begins. However, in current conventional reactor setups, it has been observed that all of the contents within the reactor are not exposed to homogenation, thus yielding large aggregates that may later contribute to a higher coarse particle content in the final product. Thus, if the homogenation can be improved, coarse particle production may be reduced.

During the first heating step, the reactor contents are heated to about 35 to about 50 or about 60° C., and the polymer aggregation proceeds. However, in large scale manufacturing facilities, this heating can take up to several hours to complete, due to the fact that the reactor jacket cannot be heated to above the glass transition temperature of the slurry contents, and due to the low heat transfer coefficient of the slurry during points of high yield stress. As a result, the reactor contents are not heated at the desired temperature of up to about 60° C. for an established period of time, but instead are heated at a varying temperature between about 21 and about 50 or about 60° C. for up to several hours, before the desired aggregation temperature is achieved. Furthermore, it is known that the high yield stress of the slurry increases during aggregation as the temperature of the batch increases. If the agitation rate is not high enough to produce a shear profile that overcomes the slurry's yield stress, then build up may occur on the walls of the reactor. Also, build up may occur on the reactor wall from a drop in the level of the slurry, due to release of air that was previously ingested during homogenation. If this build up of aggregated particles on the reactor wall is not removed during the aggregation step, then it could further contribute to coarse particle formation during the second heating step. Fusing of large aggregates will occur above the glass transition temperature of the resin in the second heating step. Thus, any large aggregates left on the reactor wall during the first heating step will fall into the batch during the second heating step, causing coarse particle formation.

In addition, these fused particles contribute to increased fouling on the reactor walls. As fouling increases, increased time, effort, and materials are required to clean the reactor. For example, if the reactor setup is to be used to produce a different toner material or different colored toner material, the changeover time required to clean the fouled reactor can be as long as a full day, requiring use of abrasive solvents such as toluene at extreme temperatures.

During the second heating step, the reactor contents are further heated to about 60 to about 100 or about 120° C., and the polymer coalescence proceeds. However, as above, in large scale manufacturing facilities this heating can take up to several hours to complete. As a result, the reactor contents are not heated at the desired temperature of about 90-100° C. for an established period of time, but instead are heated at a varying temperature between about 50 or about 60 and about 100 or about 120° C. for up to several hours, before the desired coalescence temperature is achieved.

Finally, after the coalescence is completed, the reaction is quenched by cooling the reactor contents to at least about 50 to about 65° C. or below a melting point of wax contained in the toner particles. This quenching is conducted to limit the amount of wax protrusions that are created during the cooling period as the wax crystallizes. However, as with the heating described above, in large scale manufacturing facilities this cooling can take up an hour to complete even at the lowest cooling temperature of the reactor jacket. As a result, the reactor contents are not cooled immediately to the desired temperature, but instead are slowly cooled for up to about an hour, thereby not desirably limiting the generation of wax protrusions.

To overcome these and other problems, the present disclosure provides a modified reactor scheme According to the disclosure, the conventional single-reactor process is replaced by a multi-reactor process, which enables more efficient homogenation and faster heating and cooling times. The provided process in turn allows for coarse particle reduction, optional elimination of a wet sieving step, and/or less reactor fouling and resultant faster changeover between batches.

In an embodiment, the present disclosure provides a method of making toner particles, comprising:

mixing a latex emulsion, a colorant emulsion, an optional wax emulsion, and optional additives in a first reactor to form a slurry;

discharging the slurry from the first reactor to a second reactor through a homogenizer;

heating the slurry in the second reactor to form aggregated particles in said slurry;

discharging the aggregated particles and slurry from the second reactor to a third reactor;

heating the aggregated particles and slurry in the third reactor to coalesce the aggregated particles into toner particles;

discharging the toner particles and slurry from the third reactor to a fourth reactor;

cooling the toner particles;

optionally classifying said toner particles to remove coarse particles; and optionally washing and drying said toner particles, wherein the first reactor, second reactor, third reactor, and fourth reactor comprise at least two different reactors.

In another embodiment, the present disclosure provides a method of making toner particles, comprising:

providing a slurry comprising a latex emulsion, a colorant emulsion, a wax emulsion, and optional additives in a first reactor;

homogenizing said slurry;

discharging the slurry from the first reactor to a second reactor preheated to an aggregation temperature;

aggregating particles in said slurry in the second reactor to form aggregated particles in said slurry;

discharging the aggregated particles and slurry from the second reactor to a third reactor through a heating means, wherein said heating means heats the aggregated particles and slurry to a coalescence temperature;

coalescing the aggregated particles in said slurry in the third reactor to form toner particles;

discharging the toner particles and slurry from the third reactor to a fourth reactor through a cooling means, wherein said cooling means cools the toner particles and slurry to a temperature below a melting point of the wax;

optionally classifying said toner particles to remove coarse particles; and optionally washing and drying said toner particles.

BRIEF DESCRIPTION OF THE DRAWINGS

A more complete understanding of the present disclosure can be obtained by reference to the accompanying drawings wherein:

The FIGURE illustrates an embodiment of a multi-reactor setup for an emulsion/aggregation process.

DETAILED DESCRIPTION OF EXEMPLARY EMBODIMENTS

Emulsion/aggregation toner particles are generally comprised of at least a latex emulsion polymer resin and a colorant dispersion. The toner particles preferably also include at least a wax dispersion, a coagulant and other optional additives.

Illustrative examples of specific latex for resin, polymer or polymers selected for the toner can be styrene-based monomer, acrylate-based monomers, polyester-based monomers, wax polymers, and polyolefins. Thus, for example, examples of styrene-based monomer and acrylate-based monomers include, for example, poly(styrene-alkyl acrylate), poly(styrene-1,3-diene), poly(styrene-alkyl methacrylate), poly(styrene-alkyl acrylate-acrylic acid), poly(styrene-1,3-diene-acrylic acid), poly(styrene-alkyl methacrylate-acrylic acid), poly(alkyl methacrylate-alkyl acrylate), poly(alkyl methacrylate-aryl acrylate), poly(aryl methacrylate-alkyl acrylate), poly(alkyl methacrylate-acrylic acid), poly(styrene-alkyl acrylate-acrylonitrile-acrylic acid), poly(styrene-1,3-diene-acrylonitrile-acrylic acid), poly(alkyl acrylate-acrylonitrile-acrylic acid), poly(styrene-butadiene), poly(methylstyrene-butadiene), poly(methyl methacrylate-butadiene), poly(ethyl methacrylate-butadiene), poly(propyl methacrylate-butadiene), poly(butyl methacrylate-butadiene), poly(methyl acrylate-butadiene), poly(ethyl acrylate-butadiene), poly(propyl acrylate-butadiene), poly(butyl acrylate-butadiene), poly(styrene-isoprene), poly(methylstyrene-isoprene), poly(methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly(propyl acrylate-isoprene), and poly(butyl acrylate-isoprene); poly(styrene-propyl acrylate), poly(styrene-butyl acrylate), poly(styrene-butadiene-acrylic acid), poly(styrene-butadiene-methacrylic acid), poly(styrene-butadiene-acrylonitrile-acrylic acid), poly(styrene-butyl acrylate-acrylic acid), poly(styrene-butyl acrylate-methacrylic acid), poly(styrene-butyl acrylate-acrylonitrile), poly(styrene-butyl acrylate-acrylonitrile-acrylic acid), and other similar polymers.

Illustrative examples of polymer-based resins selected for the process and particles of the present disclosure include any of the various polyesters, such as polyethylene-terephthalate, polypropylene-terephthalate, polybutylene-terephthalate, polypentylene-terephthalate, polyhexalene-terephthalate, polyheptadene-terephthalate, polyoctalene-terephthalate, polyethylene-sebacate, polypropylene sebacate, polybutylene-sebacate, polyethylene-adipate, polypropylene-adipate, polybutylene-adipate, polypentylene-adipate, polyhexalene-adipate, polyheptadene-adipate, polyoctalene-adipate, polyethylene-glutarate, polypropylene-glutarate, polybutylene-glutarate, polypentylene-glutarate, polyhexalene-glutarate, polyheptadene-glutarate, polyoctalene-glutarate polyethylene-pimelate, polypropylene-pimelate, polybutylene-pimelate, polypentylene-pimelate, polyhexalene-pimelate, polyheptadene-pimelate, poly(propoxylated bisphenol-fumarate), poly(propoxylated bisphenol-succinate), poly(propoxylated bisphenol-adipate), poly(propoxylated bisphenol-glutarate), SPAR™ (Dixie Chemicals), BECKOSOL™ (Reichhold Chemical Inc), ARAKOTE™ (Ciba-Geigy Corporation), HETRON™ (Ashland Chemical), PARAPLEX™ (Rohm & Hass), POLYLITE™ (Reichhold Chemical Inc), PLASTHALL™ (Rohm & Hass), CYGAL™ (American Cyanamide), ARMCO™ (Armco Composites), ARPOL™ (Ashland Chemical), CELANEX™ (Celanese Eng), RYNITE™ (DuPont), STYPOL™ (Freeman Chemical Corporation) mixtures thereof and the like. The resins can also be functionalized, such as sulfonated and particularly such as sodio sulfonated, if desired.

Other examples of polymer-based resins selected for the process and particles of the present disclosure include waxes or polyolefins, such as polyethylene, polypropylene, polypentene, polydecene, polydodecene, polytetradecene, polyhexadecene, polyoctadene, and polycyclodecene, polyolefin copolymers, mixtures of polyolefins, bi-modal molecular weight polyolefins, functional polyolefins, acidic polyolefins, hydroxyl polyolefins, branched polyolefins, for example, such as those available from Sanyo Chemicals of Japan as VISCOL 550P™ and VISCOL 660P™, Mitsui "Hi-wax" NP055 and NP105, or wax blends such as MicroPowders, Micropro-440 and 440w.

Mixtures of two or more of the above polymers can also be used, if desired.

As the latex emulsion polymer of the inventive toner, preferably a styrene-alkyl acrylate or a polyester such as a sulfonated polyester is used.

The latex polymer is preferably present in an amount of from about 70 to about 95% by weight of the toner particles (i.e., toner particles exclusive of external additives) on a solids basis, preferably from about 75 to about 85% by weight of the toner.

The monomers used in making the selected polymer are not limited, and the monomers utilized may include any one or more of, for example, styrene, acrylates such as methacrylates, butylacrylates, β-carboxy ethyl acrylate (β-CEA), etc., butadiene, isoprene, acrylic acid, methacrylic acid, itaconic acid, acrylonitrile, benzenes such as divinylbenzene, etc., and the like. Known chain transfer agents, for example dodecanethiol or carbon tetrabromide, can be utilized to control the molecular weight properties of the polymer. Any suitable method for forming the latex polymer from the monomers may be used without restriction.

Various suitable colorants can be employed in the toners, including suitable colored pigments, dyes, and mixtures thereof, including carbon black, such as REGAL 330 carbon black, acetylene black, lamp black, aniline black, Chrome Yellow, Zinc Yellow, SICOFAST Yellow, SUNBRITE Yellow, LUNA Yellow, NOVAPERM Yellow, Chrome Orange, BAYPLAST Orange, Cadmium Red, LITHOL Scarlet, HOSTAPERM Red, FANAL PINK, HOSTAPERM Pink, LUPRETON Pink, LITHOL Red, RHODAMINE Lake B, Brilliant Carmine, HELIOGEN Blue, HOSTAPERM Blue, NEOPAN Blue, PV Fast Blue, CINQUASSI Green, HOSTAPERM Green, titanium dioxide, cobalt, nickel, iron powder, SICOPUR 4068 FF, and iron oxides such as MAPICO Black (Columbia) NP608 and NP604 (Northern Pigment), BAYFERROX 8610 (Bayer), M08699 (Mobay), TMB-100 (Magnox), mixtures thereof and the like.

The colorant, preferably carbon black, cyan, magenta and/or yellow colorant, is incorporated in an amount sufficient to impart the desired color to the toner. In general, pigment or dye is employed in an amount ranging from about 2% to about 35% by weight of the toner particles on a solids basis, preferably from about 5% to about 25% by weight and more preferably from about 5 to about 15% by weight.

Of course, as the colorants for each color are different, the amount of colorant present in each type of color toner typically is different. For example, in preferred embodiments, a cyan toner may include about 3 to about 11% by weight of colorant (preferably Pigment Blue 15:3 from SUN), a magenta toner may include about 3 to about 15% by weight of colorant (preferably Pigment Red 122, Pigment Red 185, and/or mixtures thereof), a yellow toner may include about 3 to about 10% by weight of colorant (preferably Pigment Yellow 74), and a black toner may include about 3 to about 10% by weight of colorant (preferably carbon black).

In addition to the latex polymer binder and the colorant, the toners of the present disclosure may also optionally contain a wax, typically provided in a wax dispersion, which wax dispersion can be of a single type of wax or a mixture of two or more preferably different waxes. A single wax can be added to toner formulations, for example, to improve particular toner properties, such as toner particle shape, presence and amount of wax on the toner particle surface, charging and/or fusing characteristics, gloss, stripping, offset properties, and the like. Alternatively, a combination of waxes can be added to provide multiple properties to the toner composition.

When a wax dispersion is used, the wax dispersion can include any of the various waxes conventionally used in emulsion aggregation toner compositions. Suitable examples of waxes include, but are not limited to, polyethylene, polypropylene, polyethylene/amide, polyethylenetetrafluoroethylene, and polyethylenetrtraflouorethylene/amide. Other examples include, for example, polyolefin waxes, such as polyethylene waxes, including linear polyethylene waxes and branched polyethylene waxes, and polypropylene waxes, including linear polypropylene waxes and branched polypropylene waxes; paraffin waxes; Fischer-Tropsch waxes; amine waxes; silicone waxes; mercapto waxes; polyester waxes; urethane waxes; modified polyolefin waxes (e.g., a carboxylic acid-terminated polyethylene wax or a carboxylic acid-terminated polypropylene wax); amide waxes, such as aliphatic polar amide functionalized waxes; aliphatic waxes consisting of esters of hydroxylated unsaturated fatty acids; high acid waxes, such as high acid montan waxes; microcrystalline waxes, such as waxes derived from distillation of crude oil; and the like. By "high acid waxes" it is meant a wax material that has a high acid content. The waxes can be crystalline or non-crystalline, as desired, although crystalline waxes are preferred, in embodiments. By "crystalline polymeric waxes" it is meant that a wax material contains an ordered array of polymer chains within a polymer matrix that can be characterized by a crystalline melting point transition temperature, Tm. The crystalline melting temperature is the melting temperature of the crystalline domains of a polymer sample. This is in contrast to the glass transition temperature, Tg, which characterizes the temperature at which polymer chains begin to flow for the amorphous regions within a polymer.

To incorporate the wax into the toner, it is preferable for the wax to be in the form of one or more aqueous emulsions or dispersions of solid wax in water, where the solid wax particle size is usually in the range of from about 100 to about 500 nm.

The toners may contain the wax in any amount of from, for example, about 3 to about 15% by weight of the toner, on a dry basis. For example, the toners can contain from about 5 to about 11% by weight of the wax.

In addition, the toners may also optionally contain a coagulant and a flow agent such as colloidal silica. Suitable optional coagulants include any coagulant known or used in the art, including the well known coagulants polyaluminum chloride (PAC), polyaluminum sulfosilicate (PASS), aluminum sulfate, zinc sulfate, alum, dialkyl benzenealkyl ammonium chloride, small organic amines such as 2-methyl-1,5-pentanediamine, aluminum chloride, magnesium sulfate, magnesium chloride, potassium-aluminum sulfate, zinc acetate, mixtures thereof, and the like. The coagulant is present in the toner particles, exclusive of external additives and on a dry weight basis, in amounts of from 0 to about 3% by weight of the toner particles, preferably from about greater than 0 to about 2% by weight of the toner particles. The flow agent, if present, may be any colloidal silica such as SNOWTEX OL/OS colloidal silica. The colloidal silica is present in the toner particles, exclusive of external additives and on a dry weight basis, in amounts of from 0 to about 15% by weight of the toner particles, preferably from about greater than 0 to about 10% by weight of the toner particles.

The toner may also include additional known positive or negative charge additives in effective suitable amounts of, for example, from about 0.1 to about 5 weight percent of the toner, such as quaternary ammonium compounds inclusive of alkyl pyridinium halides, bisulfates, organic sulfate and sulfonate compositions such as disclosed in U.S. Pat. No. 4,338,390, cetyl pyridinium tetrafluoroborates, distearyl dimethyl ammonium methyl sulfate, aluminum salts or complexes, and the like.

Also, in preparing the toner by the emulsion aggregation procedure, one or more surfactants may be used in the process. Suitable surfactants include anionic, cationic and nonionic surfactants.

Anionic surfactants include sodium dodecylsulfate (SDS), sodium dodecyl benzene sulfonate, sodium dodecylnaphthalene sulfate, dialkyl benzenealkyl, sulfates and sulfonates, abitic acid, and the NEOGEN brand of anionic surfactants. An example of a preferred anionic surfactant is NEOGEN R-K available from Daiichi Kogyo Seiyaku Co. Ltd. (Japan), or Tayca Power BN2060 from Tayca Corporation (Japan), which consist primarily of branched sodium dodecyl benzene sulphonate.

Examples of cationic surfactants include dialkyl benzene alkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, $C_{12}$, $C_{15}$, $C_{17}$ trimethyl ammonium bromides, halide salts of quaternized polyoxyethylalkylamines, dodecyl benzyl triethyl ammonium chloride, MIRAPOL and ALKAQUAT available from Alkaril Chemical Company, SANISOL (benzalkonium chloride), available from Kao Chemicals, and the like. An example of a preferred cationic surfactant is SANISOL B-50 available from Kao Corp., which consists primarily of benzyl dimethyl alkonium chloride.

Examples of nonionic surfactants include polyvinyl alcohol, polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly(ethyleneoxy) ethanol, available from Rhone-Poulenc Inc. as IGEPAL CA-210, IGEPAL CA-520, IGEPAL CA-720, IGEPAL CO-890, IGEPAL CO-720, IGEPAL CO-290, IGEPAL CA-210, ANTAROX 890 and ANTAROX 897. An example of a preferred nonionic surfactant is ANTAROX 897 available from Rhone-Poulenc Inc., which consists primarily of alkyl phenol ethoxylate.

Any suitable emulsion aggregation procedure may be used in forming the emulsion aggregation toner particles without restriction. These procedures typically include the basic process steps of at least aggregating an emulsion containing binder, one or more colorants, optionally one or more surfactants, optionally a wax emulsion, optionally a coagulant and one or more additional optional additives to form aggregates, subsequently coalescing or fusing the aggregates, and then recovering, classifying, optionally washing and optionally drying the obtained emulsion aggregation toner particles.

An example emulsion/aggregation/coalescing process preferably includes forming a mixture of latex binder, colorant dispersion, wax emulsion, optional coagulant and deionized water in a vessel. The mixture is then stirred using a homogenizer until homogenized and then transferred to a reactor (or maintained in the same reactor) where the homogenized mixture is heated to a temperature of, for example, about 50° C. and held at such temperature for a period of time to permit aggregation of toner particles to the desired size. Once the desired size of aggregated toner particles is achieved, the pH of the mixture is adjusted in order to inhibit further toner aggregation. The toner particles are further heated to a temperature of, for example, about 90° C. and the pH lowered in order to enable the particles to coalesce and spherodize. The heater is then turned off and the reactor mixture allowed to cool to room temperature, at which point the aggregated and coalesced toner particles are recovered and optionally washed and dried.

Most preferably, following coalescence and aggregation, the particles are wet sieved through an orifice of a desired size in order to remove particles of too large a size, washed and treated to a desired pH, and then dried to a moisture content of, for example, less than 1% by weight.

However, according to the present disclosure, such conventional emulsion/aggregation processes and related equipment are modified to provide a more efficient production method and apparatus. Specifically, the single reactor conventionally utilized to homogenize and subsequently conduct the first and second heating steps and cooling step, is replaced by a multi-reactor system, optionally with added heating, cooling and/or mixing means interposed therebetween.

As described above, the aggregation/coalescence step in conventional emulsion/aggregation processes generally includes at least four steps, namely homogenation, a first heating step for aggregation, a second heating step for coalescence, and a cooling step. In such conventional emulsion/aggregation processes, all of these steps are conducted in the same reactor, leading to the above-described problems of high reactor fouling, coarse particle formation, and the like.

However, these problems can be addressed and minimized by using multiple reactors rather than a single reactor to conduct the aggregation/coalescence process. In between the reactors, suitable mixing, heating and/or cooling means can be provided, to conduct or assist in the actual homogenation, heating, and cooling operations, so that the desired slurry conditions (mixing, temperature) can be more quickly provided in preparation for the actual steps of aggregation and coalescence.

In embodiments, at least two reactors are used to conduct the aggregation/coalescence process. In other embodiments, at least three or even at least four reactors can be used to conduct the aggregation/coalescence process. Where two reactors are used, the reaction slurry can be passed back and forth between the two reactors, effectively simulating the use of three or four reactors. Alternatively, three reactors can be used to minimize the passing back and forth between two reactors, and thus freeing up earlier reactors in the process for increased process throughput. In this embodiment, at least one of the reactors is used twice, such as using, in sequence, the first reactor, the second reactor, the third reactor, and then reusing the first reactor. A further alternative is to use four reactors, where no reactor is reused in the process. These different embodiments can thus provide process design alternatives to, for example, maximize process throughput, maximize available space, and the like.

The process will now be described in greater detail with reference to the FIGURE, although it is understood that the FIGURE represents only a single embodiment, and the disclosure is not limited thereto. The FIGURE illustrates an embodiment of a multi-reactor (three reactor) setup for the aggregation/coalescence steps of an emulsion/aggregation process.

In a first step, conducted in a first reactor 1 or mixing vessel, the various components and optional additives are provided. Thus, for example, in the first reactor can be provided the latex emulsion or dispersion of primary polymer particles, a colorant dispersion or emulsion, deionized water or other solvent or liquid medium, an optional wax dispersion or emulsion, and any other optional desired additives, such as surfactants, and the like. In this embodiment, the amount of deionized water added to form the slurry can be any amount conventionally used in emulsion/aggregation processes. Alternatively, the amount of deionized water added to form the slurry can be less than the normal amount, as long as it is enough to provide a sufficient liquid medium to conduct the mixing and homogenization steps. The remaining amount of deionized water can be added directly into the second reactor and preheated, as described in detail below.

Preferably, the first reactor 1 is maintained at about room temperature, such as from about 20 to about 30° C., or is maintained at about 35° C. or less. This temperature can be maintained, for example, by suitable control of the ambient atmosphere, or by use of any suitable heating or cooling device provided with the reactor 1, such as a heating or cooling jacket (not shown). As the mixing generally does not create large amounts of heat, the mixing operation conducted in the reactor 1 generally does not generate heat that would require additional temperature control.

Once the components are added or provided in the first reactor 1, the components are mixed or stirred under a high shear force. For example, stirring can be conducted by any suitable device, including a polytron. Of course, the above components can be added or provided and mixed together either all at once, or in different orders, as desired.

Following desired mixing or stirring and formation of a slurry, or during such mixing or stirring, a suitable amount of flocculent or coagulant is added and mixed with the remaining slurry. The slurry is then discharged from the first reactor 1 to a second reactor 2, through a homogenizer 5. As used herein, the "homogenizer" is any suitable equipment that enables the mechanical breakdown of a fine solid dispersion (toner slurry) through high speed mechanical and hydraulic shear, and any like equipment producing similar results. Many different tooling configurations can be specified to provide varying levels of mixing, shear, and particle size reduction, as is known in the art.

In an alternative embodiment, the first reactor 1 and the homogenizer 5 can be combined into a single process unit. In this embodiment, the slurry components would be provided, mixed, and homogenized in the same process unit, prior to being discharged to the second reactor 2.

The second reactor 2 is used to conduct aggregation of the primary polymer particles, colorant particles, and the like in the slurry, into toner-sized aggregated particles. This aggregation is generally conducted at a temperature below the glass transition temperature of the polymer resin. In embodiments, the second reactor 2 is heated to a temperature of from about 35 to about 60° C. to conduct the aggregation process. Preferably, in the interest of achieving the objectives such as increased throughput, less coarse particle generation, less reactor fouling, and the like, the second reactor 2 is preheated to the desired aggregation temperature. This preheating con be conducted, for example, by preheating the reactor vessel itself to the desired temperature, for example by use of any suitable heating device such as a heating jacket disposed around the reactor (not shown). This preheating can be conducted, for example, before the slurry is introduced into the second reactor 2, such as during the operations being conducted in the first reactor 1. In addition, the second reactor 2 can be provided to include an amount of deionized water or solvent (such as the remaining amount of deionized water or solvent mentioned above) that would normally be included in the reaction slurry mixture. That amount of deionized water or solvent contained in the second reactor 2 can also be preheated to the desired aggregation temperature. Thus, when the slurry is charged into the second reactor 2 from the homogenizer 5, the resultant combined slurry will have a higher temperature, and the heating of the combined slurry to the desired aggregation temperature will be much faster.

Any adjustment of the temperature, such as heating the combined slurry to the desired aggregation temperature, can be conducted by any suitable means. For example, the remaining heating can be conducted by a conventional heating jacket around the reactor. Alternatively, a heating means such as a heat exchanger can be interposed between the homogenizer and the second reactor 2, to increase the temperature of the slurry prior to its introduction into the second reactor 2. Further, by such preheating of the second reactor 2, the heating from substantially room or ambient temperature to the aggregation temperature can be conducted in this embodiment in a matter of minutes, or instantaneously, rather than over a period of an hour or more as required in conventional processes.

This preheating of the second reactor 2 allows for improved process operation. For example, by more rapidly achieving the desired aggregation temperature, the aggregation particle growth occurs more rapidly and at a more uniform rate, rather than starting at a slow rate and increasing the particle growth rate as the temperature is increased.

Following desired aggregation of the primary particles, the aggregation process is stopped, and a coalescence process is started. This can be conducted by discharging the slurry from the second reactor 2 to a third reactor 3, preferably through a heating means 6.

The third reactor 3 is used to conduct coalescence of the formed aggregated toner-sized particles into final toner particles. This coalescence is generally conducted at a temperature above the glass transition temperature of the polymer resin. In embodiments, the third reactor 3 is heated to a temperature of from about 60 to about 120° C. or more to conduct the coalescence process. Preferably, in the interest of achieving the objectives such as increased throughput, less coarse particle generation, less reactor fouling, and the like, the third reactor 3 is also preheated to the desired coalescence temperature. This preheating con be conducted, for example, by preheating the reactor vessel itself to the desired temperature, for example by use of any suitable heating device such as a heating jacket disposed around the reactor (not shown). This preheating can be conducted, for example, before the slurry is introduced into the third reactor 3, such as during the operations being conducted in the first reactor 1 and/or the second reactor 2.

Further to help minimize the time required to heat the slurry from the aggregation temperature to the coalescence temperature, a heating means can be interposed between the second reactor 2 and the third reactor 3. This heating means can be used, for example, to completely or partially raise the temperature of the slurry from the aggregation temperature to the coalescence temperature during its transport between the second reactor 2 and the third reactor 3. Preferably, the heating means raises the slurry temperature to the coalescence temperature, or within about 5 or about 10 degrees of the coalescence temperature, but preferably without exceeding the coalescence temperature. Thus, when the slurry is charged into the third reactor 3 from the second reactor 2, the resultant slurry will have a higher temperature, and any additional heating of the combined slurry to the desired coalescence temperature will be much faster.

In this embodiment, any suitable heating means can be used. For example, suitable heating means include a heat exchanger, an in-line heater, and the like.

Any subsequent adjustment of the temperature, such as heating the combined slurry to the desired coalescence temperature, if needed, can be conducted by any suitable means. For example, the remaining heating can be conducted by a conventional heating jacket around the reactor.

This preheating of the third reactor 3 allows for improved process operation. For example, by more rapidly achieving the desired coalescence temperature, the particle coalescence occurs more rapidly and at a more uniform rate, rather than starting at a slow rate and increasing the coalescence rate as the temperature is increased from the aggregation temperature to the coalescence temperature. For example, the heating from the aggregation temperature to the coalescence temperature can be conducted in this embodiment in a matter of minutes, or instantaneously, rather than over a period of several hours as required in conventional processes.

Advantages of using a separate second reactor 2 and third reactor 3 are that coarse particle formation and reactor fouling are decreased. Because a separate reactor is used, the aggregate particles that adhere to the second reactor wall are not introduced into the coalescence step. That is, the aggregate particles are not present on and then fall off of the wall into the slurry in the third reactor, and thus are not coalesced along with the desired toner-sized particles in the slurry. Further, because the aggregation and coalescence temperatures are more rapidly achieved, the particle growth and coalescence is more uniform, resulting in more uniform sized particles and also less coarse particles.

In addition, reactor fouling is significantly decreased. Because the aggregated particles that are adhered to the wall in the second reactor are not further heated (such as at the coalescence temperature), the fouling can be much easier removed from the reactor wall. For example, rather than requiring lengthy treatment with harsh chemicals such as toluene at extreme temperatures, the reactor cleaning can be conducted using a simple rinse of deionized water. Process downtime is thus significantly reduced, with a resulting increase in process efficiency.

Following desired coalescence of the toner-sized particles into final toner particles, the coalescence process is stopped. This process can be stopped, for example, be decreasing the slurry temperature to below the glass transition temperature of the polymer resin. This can be conducted by discharging the slurry from the third reactor 3 to a fourth reactor, shown in the FIGURE as re-using the first reactor 1, preferably through a cooling means 7.

The fourth reactor (shown as first reactor 1) is used to conduct cooling of the toner particles from the coalescence temperature to substantially room or ambient temperature. Preferably, the cooling comprises at least quickly reducing the slurry temperature to below a melting point of any wax contained in the toner particles, following by further cooling to room temperature or otherwise for subsequent processing. Quick cooling, or quenching, is desired because until the temperature is lowered below a melting point of any wax contained in the toner particles, the wax can continue to move within the toner particles as the wax crystallizes to form wax protrusions on the particle surface. This is generally undesirable, and is preferably minimized to provide high quality toner particles.

Generally, the quick cooling reduces the temperature of the slurry to about 65° C. or below, or about 60° C. or below, and preferably below a melting point of any wax contained in the toner particles.

To help minimize the time required to cool or quench the slurry from the coalescence temperature to the desired cooling temperature, a cooling means 7 can be interposed between the third reactor 3 and the fourth reactor (shown as first reactor 1). This cooling means can be used, for example, to completely or partially lower the temperature of the slurry from the coalescence temperature to the desired cooling temperature during its transport between the third reactor 3 and the fourth reactor (shown as first reactor 1). Preferably, the cooling means lowers the slurry temperature from the coalescence temperature to below a melting point of any wax contained in the toner particles such as to about 65° C. or below. However, in embodiments, the cooling means can be used to reduce the slurry temperature to a further extent, such as from the coalescence temperature to about 50° C. or less, such as to about 40° C. or less or even to about 30° C. or less.

In this embodiment, any suitable cooling can be used. For example, suitable cooling include a heat exchanger, an in-line cooler, and the like.

Any subsequent adjustment of the temperature, such as further cooling of the slurry down to room or ambient temperature, if needed, can be conducted by any suitable means. For example, the remaining cooling can be conducted by a conventional cooling jacket around the reactor.

This fast or nearly instantaneous cooling of the slurry from the coalescence temperature to below a melting point of any wax contained in the toner particles allows for improved process operation. For example, by more rapidly achieving the desired cooling temperature, the particle coalescence is more uniformly stopped, rather than slowing down over a period of time as the temperature is slowly lowered. This in turn provides a faster process, with more precise and uniform particle size control. Additionally, the fast cooling prevents or minimizes formation of wax protrusions on the toner particle surfaces. For example, the cooling from the coalescence temperature to below a melting point of any wax contained in the toner particles can be conducted in this embodiment in a matter of minutes, or instantaneously, rather than over a period of about an hour as required in conventional processes.

A further advantage of the processes and systems of this disclosure is that generation of coarse particles is avoided or substantially prevented. Accordingly, in embodiments, it may not be necessary to conduct any subsequent classification step, such as a wet sieving operation, to remove coarse particles.

Although the process and apparatus is described above with respect to the particular embodiment of the FIGURE, it will be apparent and understood that the disclosure is not limited to such an embodiment. For example, as described above, modifications are encompassed that include a different number of separate reactors. Likewise, it will be apparent and understood that additional components not shown in the FIGURE can and are readily used, such as, for example, pumps, valves, inlet and outlet ports, temperature control and monitoring apparatus, mixers, and the like. Such modifications are likewise encompassed hereby.

Furthermore, as will be apparent and understood, any r all of the above-described reactor units can include suitable mixing means, to maintain proper mixing of the reactor components. Although not specifically described above, any or all of the first, second, third and/or fourth reactors can further include a mixer, as desired.

Furthermore, other modifications to the above process will be apparent and understood based on conventional emulsion/aggregation processes. Thus, for example, the above process can be readily modified to allow for the addition of pH controlling agents, used in their known amounts for known purposes such as to control pH for the purposes of controlling the aggregation and coalescence steps. Likewise, the process can be readily modified, for example, to allow for the addition of a second quantity of monomer material such as in the form of a latex emulsion between the aggregation and coalescence steps, which additional monomer would thereby provide a shell around the exterior of the aggregated particles. Other modifications are also envisioned, and can be readily implemented in the present process.

The toner particles are preferably made to have the following physical properties when no external additives are present on the toner particles.

The toner particles preferably have a surface area, as measured by the well known BET method, of about 1.3 to about 6.5 $m^2/g$. More preferably, for cyan, yellow and black toner particles, the BET surface area is less than 2 $m^2/g$, preferably from about 1.4 to about 1.8 $m^2/g$, and for magenta toner, from about 1.4 to about 6.3 $m^2/g$.

It is also desirable to control the toner particle size and limit the amount of both fine and coarse toner particles in the toner. In a preferred embodiment, the toner particles have a very narrow particle size distribution with a lower number ratio geometric standard deviation (GSD) of approximately 1.15 to approximately 1.30, more preferably approximately less than 1.25. The toner particles also preferably have a size such that the upper geometric standard deviation (GSD) by volume is in the range of from about 1.15 to about 1.30, preferably from about 1.18 to about 1.22, more preferably less than 1.25.

These GSD values for the toner particles of embodiments indicate that the toner particles are made to have a very narrow particle size distribution. Also, in a preferred embodiment, the toner particles have a coarse content where the volume % between 12.00 and 50.00 microns is <10%, preferably <5%.

Shape factor is also an important control process parameter associated with the toner being able to achieve optimal machine performance. The toner particles of embodiments preferably have a shape factor of about 105 to about 170, more preferably about 110 to about 160, SF1*a. Scanning electron microscopy (SEM) is used to determine the shape factor analysis of the toners by SEM and image analysis (IA) is tested. The average particle shapes are quantified by employing the following shape factor (SF1*a) formula: $SF1*a=100\pi d^2/(4A)$, where A is the area of the particle and d is its major axis. A perfectly circular or spherical particle has a shape factor of exactly 100. The shape factor SF1*a increases as the shape becomes more elongated or needle-like.

The toner particles of embodiments preferably have a circularity from about 0.930 to about 0.990, more preferably from about 0.950 to about 0.980. A measurement system called the SYSMEX FPIA 2100 measures the particle circularity, where Circularity of the particle=(Perimeter of a circle having the same area as the particle/Perimeter of particle).

The toner particles of embodiments also preferably have a Melt Flow Index of from about 12 g/10 min to about 50 g/10 min, more preferably from about 15 g/10 min to about 35 g/10 min. A Melt Indexer is used to determine the Melt Flow Index of the toner particle using conditions including temperature of 130° C. and a total load (including piston weight) of 5.0 kg. The equilibrium time shall be six minutes.

In addition to the foregoing, the toner particles of embodiments also have the following rheological and flow properties. First, the toner particles preferably have the following molecular weight values, each as determined by gel permeation chromatography (GPC) as known in the art. The binder of the toner particles preferably has a weight average molecular weight, Mw of from about 15,000 daltons to about 90,000 daltons.

Overall, the toner particles embodiments preferably have a weight average molecular weight (Mw) in the range of about 17,000 to about 60,000 daltons, a number average molecular weight (Mn) of about 9,000 to about 18,000 daltons, and a MWD of about 2.1 to about 10. MWD is a ratio of the Mw to Mn of the toner particles, and is a measure of the polydispersity, or width, of the polymer. For cyan and yellow toners, the toner particles preferably exhibit a weight average molecular weight (Mw) of about 22,000 to about 38,000 daltons, a number average molecular weight (Mn) of about 9,000 to about 13,000 daltons, and a MWD of about 2.2 to about 3.3. For black and magenta, the toner particles preferably exhibit a weight average molecular weight (Mw) of about 22,000 to about 38,000 daltons, a number average molecular weight (Mn) of about 9,000 to about 13,000 daltons, and a MWD of about 2 to about 10.

Further, the toners of embodiments preferably have a specified relationship between the molecular weight of the latex binder and the molecular weight of the toner particles obtained following the emulsion aggregation procedure. As understood in the art, the binder undergoes crosslinking during processing, and the extent of crosslinking can be controlled during the process. The relationship can best be seen with respect to the molecular peak values for the binder. Molecular peak is the value that represents the highest peak of the weight average molecular weight. In embodiments, the binder preferably has a molecular peak (Mp) in the range of from about 23,000 to about 28,0000, preferably from about 23,500 to about 27,500 daltons. The toner particles prepared from such binder also exhibit a high molecular peak, for example of about 25,000 to about 30,000, preferably about 26,000 to about 27,800 daltons, indicating that the molecular peak is driven by the properties of the binder rather than another component such as the colorant.

Another property of the toners of embodiments is the cohesivity of the particles prior to inclusion of any external additives. The greater the cohesivity, the less the toner particles are able to flow. The cohesivity of the toner particles, prior to inclusion of any external additives, may be from, for example, about 55 to about 98% for all colors of the toner. Cohesivity was measured by placing a known mass of toner, two grams, on top of a set of three screens, for example with screen meshes of 53 microns, 45 microns, and 38 microns in order from top to bottom, and vibrating the screens and toner for a fixed time at a fixed vibration amplitude, for example for 90 seconds at a 1 millimeter vibration amplitude. A device to perform this measurement is a Hosokawa Powders Tester, available from Micron Powders Systems. The toner cohesion value is related to the amount of toner remaining on each of the screens at the end of the time, and is calculated by the formula: % cohesion=$50*A+30*B+10*C$, where A, B and C are respectively the weight of the toner remaining on the 53 microns, 45 microns, and 38 microns screens, respectively. A cohesion value of 100% corresponds to all of the toner remaining on the top screen at the end of the vibration step and a cohesion value of zero corresponds to all of the toner passing through all three screens, that is, no toner remaining on any of the three screens at the end of the vibration step. The higher the cohesion value, the lesser the flowability of the toner.

Finally, the toner particles preferably have a bulk density of from about 0.22 to about 0.34 g/cc and a compressibility of from about 33 to about 51.

The toner particles of embodiments can optionally be blended with external additives following formation. Any suitable surface additives may be used. Most preferred are one or more of $SiO_2$, metal oxides such as, for example, $TiO_2$ and aluminum oxide, and a lubricating agent such as, for example, a metal salt of a fatty acid (e.g., zinc stearate (ZnSt), calcium stearate) or long chain alcohols such as UNILIN® 700, as external surface additives. In general, silica is applied to the toner surface for toner flow, tribo enhancement, admix control, improved development and transfer stability and higher toner blocking temperature. $TiO_2$ is applied for improved relative humidity (RH) stability, tribo control and improved development and transfer stability. Zinc stearate is preferably also used as an external additive for the toners, the zinc stearate providing lubricating properties. Zinc stearate provides developer conductivity and tribo enhancement, both due to its lubricating nature. In addition, zinc stearate enables higher toner charge and charge stability by increasing the number of contacts between toner and carrier particles. Calcium stearate and magnesium stearate provide similar functions. Most preferred is a commercially available zinc stearate known as Zinc Stearate L, obtained from Ferro Corporation. The external surface additives can be used with or without a coating.

Most preferably, the toners contain from, for example, about 0.1 to about weight percent titania, about 0.1 to about 8 weight percent silica and about 0.1 to about 4 weight percent zinc stearate.

The toner particles can optionally be formulated into a developer composition by mixing the toner particles with carrier particles. Illustrative examples of carrier particles that can be selected for mixing with the toner composition prepared in accordance with the present disclosure include those particles that are capable of triboelectrically obtaining a charge of opposite polarity to that of the toner particles. Accordingly, in one embodiment the carrier particles may be selected so as to be of a negative polarity in order that the toner particles that are positively charged will adhere to and surround the carrier particles. Illustrative examples of such carrier particles include, iron, iron alloys, steel, nickel, ferrites, including ferrites that incorporate strontium, magnesium, manganese, copper, zinc, and the like, magnetites and the like. Additionally, there can be selected as carrier particles nickel berry carriers as disclosed in U.S. Pat. No. 3,847,604, the entire disclosure of which is totally incorporated herein by reference, comprised of nodular carrier beads of nickel, characterized by surfaces of reoccurring recesses and protrusions thereby providing particles with a relatively large external area. Other carriers are disclosed in U.S. Pat. Nos. 4,937,166 and 4,935,326, the disclosures of which are totally incorporated herein by reference.

The selected carrier particles can be used with or without a coating, the coating generally being comprised of acrylic and methacrylic polymers, such as methyl methacrylate, acrylic and methacrylic copolymers with fluoropolymers or with monoalkyl or dialklyamines, fluoropolymers, polyolefins, polystrenes, polyvinylidene fluoride resins, terpolymers of styrene, and a silane, such as triethoxy silane, tetrafluoroethylenes, other known coatings and the like.

The carrier particles can be mixed with the toner particles in various suitable combinations. The toner concentration is usually about 2% to about 10% by weight of toner and about 90% to about 98% by weight of carrier. However, one skilled in the art will recognize that different toner and carrier percentages may be used to achieve a developer composition with desired characteristics.

Toners of embodiments can be used in known electrostatographic imaging methods. Thus for example, the toners or developers of embodiments can be charged, e.g., triboelectrically, and applied to an oppositely charged latent image on an imaging member such as a photoreceptor or ionographic receiver. The resultant toner image can then be transferred, either directly or via an intermediate transport member, to a support such as paper or a transparency sheet. The toner image can then be fused to the support by application of heat and/or pressure, for example with a heated fuser roll.

It is envisioned that the toners of the present disclosure may be used in any suitable procedure for forming an image with a toner, including in applications other than xerographic applications.

An example is set forth hereinbelow and is illustrative of different compositions and conditions that can be utilized in practicing the disclosure. All proportions are by weight unless otherwise indicated. It will be apparent, however, that the disclosure can be practiced with many types of compositions and can have many different uses in accordance with the disclosure above and as pointed out hereinafter.

EXAMPLES

Example 1

A latex emulsion is provided containing styrene/n-butyl acrylate (79:21 weight ratio), water, and surfactants. A wax emulsion is provided containing POLYWAX® 725 in water. Also separately provided is a pigment dispersion of an aqueous dispersion of Blue 15.3 pigment, obtained from Sun Chemicals. The pigment dispersion contains an anionic surfactant. The content of the pigment dispersion is 26.5 percent pigment, 2 percent surfactant, and 71.5 percent water.

In a first 5 gallon reactor, equipped with an overhead stirrer, are mixed 37.6 parts by weight latex emulsion having a 42.66 percent solids content, 13.7 parts by weight wax emulsion having a solids content of 18.28 percent, 8.6 party by weight pigment dispersion having a solids content of 26.5 percent, and 40.1 parts by weight deionized water. The water added to this first reactor represents half of the total amount of deionized water that would ordinarily be added for such an emulsion/aggregation process; the balance being added separately to a second reactor as described below. The components are mixed with high shear stirring with an overhead mixer. To this mixture is added 3.2 parts by weight (of the total reactor contents) of a coagulant solution consisting of 10 weight percent poly(aluminiumchloride) (PAC) and 90 wt. % 0.02M $HNO_3$ solution.

The reactor contents are immediately discharged from the first reactor, through a homogenizer under high shear, into a second reactor. The second reactor is preheated to about 47° C., and includes the remaining amount of deionized water omitted from the first reactor above, also preheated to about 47° C. The second reactor contents are continuously mixed with an overhead mixer and the reactor is held at about 47° C. for 75 minutes producing particles of approximately 5.0 microns and GSD by volume=1.21 and substantially no coarse particles.

Once the average particle size of 5.0 microns is achieved, caustic material is added to cease particle growth, and the reactor contents are immediately discharged from the second reactor, through a heat exchanger, into a third reactor. The third reactor is preheated to about 97° C., and the heat exchanger substantially instantaneously heats the slurry and aggregated particles to about 97° C. before introduction into the third reactor. The third reactor contents are continuously mixed with an overhead mixer, and the reactor is held at about 97° C. and the resultant mixture is then allowed to coalesce for 5 hrs at a temperature of 97° C. The morphology of the particles is smooth and "potato" shape.

Next, the coalesced particles in the third reactor are immediately discharged from the third reactor, through a heat exchanger, back into the first reactor. The first reactor is maintained at about room temperature, and the heat exchanger substantially instantaneously cools the slurry and aggregated particles to about 61° C. before introduction into the first reactor. The first reactor contents are then cooled down to room temperature by an integral cooling jacket.

The final particle size after cooling but before washing is 5.98 microns with a GSDv of 1.21. The particles are washed with deionized water at room temperature. The final average particle size of the dried particles is 6.06 microns with $GSD_v$=1.20 and $GSD_n$=1.25

Because substantially no coarse particles are produced during the process, a wet sieving step is not required prior to the washing steps.

It will be appreciated that various of the above-disclosed and other features and functions, or alternatives thereof, may be desirably combined into many other different systems or applications. Also that various presently unforeseen or unanticipated alternatives, modification, variations or improvements therein may be subsequently made by those skilled in the art which are also intended to be encompassed by the following claims.

What is claimed is:

1. A method of making toner particles, comprising:
   mixing a latex emulsion, a colorant emulsion, an optional wax emulsion, and optional additives in a first reactor to form a slurry;
   discharging the slurry from the first reactor to a second reactor through a homogenizer;
   heating the slurry in the second reactor to form aggregated particles in said slurry;
   discharging the aggregated particles and slurry from the second reactor to a third reactor;
   heating the aggregated particles and slurry in the third reactor to coalesce the aggregated particles into toner particles;
   discharging the toner particles and slurry from the third reactor to a fourth reactor;
   cooling the toner particles by quenching;
   optionally classifying said toner particles to remove coarse particles; and
   optionally washing and drying said toner particles,
   wherein the first reactor, second reactor, third reactor, and fourth reactor comprise at least two different reactors.

2. The process of claim 1, wherein said first, second, third, and fourth reactors comprise at least two different reactors, such that said first and second reactors are different, said second and third reactors are different, and said third and fourth reactors are different.

3. The process of claim 1, wherein said first, second, third, and fourth reactors comprise at least three different reactors, such that said first and second reactors are different, said second and third reactors are different, and said third and fourth reactors are different.

4. The process of claim 1, wherein said first, second, third, and fourth reactors comprise four different reactors.

5. The process of claim 1, wherein said second reactor is charged with an amount of deionized water and is preheated to an aggregation temperature of said slurry prior to said slurry being charged into said second reactor.

6. The process of claim 1, further comprising heating the aggregated particles and slurry from the second reactor to a coalescence temperature prior to introduction into the third reactor using a heating means located between said second reactor and said third reactor.

7. The process of claim 6, wherein said heating means is a heat exchanger.

8. The process of claim 1, further comprising cooling the toner particles and slurry from the third reactor to below a coalescence temperature prior to introduction into the fourth reactor using a cooling means located between said third reactor and said fourth reactor.

9. The process of claim 8, wherein said cooling means is a heat exchanger.

10. The process of claim 8, wherein said slurry further comprises said wax emulsion, and said cooling means cools the toner particles and slurry to below a melting point of said wax and below a glass transition temperature of a resin of said latex emulsion.

11. The process of claim 1, wherein said slurry further comprises a coagulant.

12. The process of claim 1, wherein said process does not comprise said optional classifying step.

13. The process of claim 1, wherein:
   the first reactor is maintained at a temperature less than about 30° C.;
   the second reactor is maintained at a temperature of from about 35 to about 60° C.;

the third reactor is maintained at a temperature of from about 60 to about 120° C.; and the fourth reactor is maintained at a temperature less than about 65° C.

14. A method of making toner particles, comprising:

providing a slurry comprising a latex emulsion, a colorant emulsion, a wax emulsion, and optional additives in a first reactor;

homogenizing said slurry;

discharging the slurry from the first reactor to a second reactor preheated to an aggregation temperature;

aggregating particles in said slurry in the second reactor to form aggregated particles in said slurry;

discharging the aggregated particles and slurry from the second reactor to a third reactor through a heating means, wherein said heating means heats the aggregated particles and slurry to a coalescence temperature;

coalescing the aggregated particles in said slurry in the third reactor to form toner particles;

discharging the toner particles and slurry from the third reactor to a fourth reactor through a cooling means, wherein said cooling means cools the toner particles and slurry to a temperature below a melting point of the wax by quenching;

optionally classifying said toner particles to remove coarse particles; and optionally washing and drying said toner particles.

15. The process of claim 14, wherein said homogenizing is conducted in said first reactor.

16. The process of claim 14, wherein said homogenizing is conducted in a homogenizer interposed between said first reactor and said second reactor.

17. The process of claim 14, wherein said first, second, third, and fourth reactors comprise at least two different reactors, such that said first and second reactors are different, said second and third reactors are different, and said third and fourth reactors are different.

18. The process of claim 14, wherein said heating means is a heat exchanger.

19. The process of claim 14, wherein said cooling means is a heat exchanger.

20. The process of claim 14, wherein said slurry further comprises a coagulant.

21. The process of claim 14, wherein said process does not comprise said optional classifying step.

22. The process of claim 14, wherein:

the first reactor is maintained at a temperature less than about 30° C.;

the second reactor is maintained at a temperature of from about 35 to about 60° C.;

the third reactor is maintained at a temperature of from about 60 to about 120° C.; and the fourth reactor is maintained at a temperature less than about 65° C.

* * * * *